United States Patent
Takenaka et al.

(10) Patent No.: US 6,393,849 B1
(45) Date of Patent: May 28, 2002

(54) AIR-CONDITIONING APPARATUS AND CONTROL PROCEDURE FOR VARIABLE DISPLACEMENT COMPRESSOR

(75) Inventors: Kenji Takenaka; Masaki Ota; Yoichiro Kashiwagi; Masahiro Kawaguchi; Masanori Sonobe; Tomoji Tarutani; Yasuharu Odachi; Hirotaka Kurakake; Kazuhito Miyagawa, all of Kariya; Yasushi Yamanaka, Aichi-ken, all of (JP)

(73) Assignees: Kabushiki Kaisha Toyoda Jidoshokki Seisakusho; Denso Corporation, both of Kariya (JP)

(*) Notice: Subject to any disclaimer, the term of this patent is extended or adjusted under 35 U.S.C. 154(b) by 0 days.

(21) Appl. No.: 09/610,754

(22) Filed: Jul. 6, 2000

(30) Foreign Application Priority Data

Jul. 7, 1999 (JP) .......................... 11-192695
Sep. 17, 1999 (JP) .......................... 11-263677

(51) Int. Cl.[7] .............................................. B60H 1/32
(52) U.S. Cl. .............................. 62/133; 62/209; 62/215; 62/228.1
(58) Field of Search .......................... 62/133, 208, 209, 62/215, 228.1; 361/22

(56) References Cited

U.S. PATENT DOCUMENTS 4,334,255 A * 6/1982 Izumi .......................... 361/22
4,424,682 A * 1/1984 Miska et al. .................. 62/133
4,823,555 A * 4/1989 Ohkumo ...................... 62/133
5,022,232 A * 6/1991 Sakamoto et al. ............ 62/133
5,285,649 A * 2/1994 Yamanaka et al. ............ 62/133
5,385,029 A * 1/1995 Yamanaka et al. ............ 62/133
5,546,755 A * 8/1996 Krieger ........................ 62/133
5,761,917 A * 6/1998 Corcoran et al. ............. 62/133
5,893,272 A * 4/1999 Hanselmann et al. ......... 62/133
5,924,296 A * 7/1999 Tanako et al. ................ 62/133
5,950,440 A * 9/1999 Niimi et al. .................. 62/133
6,199,391 B1 * 3/2001 Link et al. .................... 62/133

FOREIGN PATENT DOCUMENTS

JP          10-278567        10/1998

* cited by examiner

Primary Examiner—Teresa Walberg
Assistant Examiner—Fadi H. Dahbour
(74) Attorney, Agent, or Firm—Morgan & Finnegan, LLP

(57) ABSTRACT

An air-conditioning apparatus having a refrigerant circuit including a condenser, a pressure reducing device, an evaporator, and a variable displacement compressor. The air-conditioning apparatus has a torque detecting device and an external information detecting device. The torque detecting device directly or indirectly detects the reaction torque acting on the compressor, and the external information detecting device detects various external information other than the torque. The air-conditioning apparatus further has a control device for determining a target torque in accordance with the external information provided by the external information detecting device. The control device executes a feedback control program for controlling the displacement of the compressor such that the torque detected by the torque detecting device approaches the target torque.

16 Claims, 11 Drawing Sheets

AIR-CONDITIONING APPARATUS AND CONTROL PROCEDURE FOR VARIABLE DISPLACEMENT COMPRESSOR

BACKGROUND OF THE INVENTION

The present invention relates to air-conditioning apparatuses having a refrigerant circuit including a condenser, a pressure reducing device, an evaporator, and a variable displacement compressor, and, more particularly, to procedures for controlling the displacement of a variable displacement compressor installed in a vehicle air-conditioning apparatus.

A typical air-conditioning apparatus for a vehicle has a refrigerant circuit including a condenser, an expansion valve (pressure reducing device), an evaporator, and a compressor. The evaporator sends refrigerant gas to the compressor by which the gas is compressed and sent to the condenser. The evaporator exchanges heat between the refrigerant flowing in the refrigerant circuit and the air drawn in a passenger compartment. That is, heat is transferred from the air passing through the evaporator to the refrigerant flowing through the evaporator. The amount of the transferred heat varies in accordance with the heat load, or the cooling load. The pressure of the refrigerant gas at the outlet of the evaporator or downstream from the evaporator thus reflects the amount of the cooling load. A variable displacement compressor, which is often used in vehicles, has a displacement control mechanism. The control mechanism maintains the pressure at the outlet of the evaporator (suction pressure Ps) at a predetermined target value (target pressure Pset). Specifically, the displacement control mechanism executes a feedback control program for adjusting the displacement of the compressor to alter the inclination angle of a swash plate, in accordance with the suction pressure Ps, so that the displacement corresponds to the cooling load. The displacement control mechanism typically includes a displacement control valve, or an internal control valve. The internal control valve has a pressure sensitive member such as a bellows or diaphragm for sensing the suction pressure Ps. The valve further includes a valve body that is positioned in accordance with movement of the pressure sensitive member. The valve body varies the opening size of the internal control valve to adjust the pressure in a chamber accommodating the swash plate (crank chamber). The inclination angle of the swash plate is thus determined.

However, if the target pressure Pset is fixed, or if the internal control valve is not capable of varying the target pressure Pset, the desired cooling cannot be performed accurately. Thus, the internal control valve is configured to vary the target pressure Pset through an external electric control procedure. Specifically, the internal control valve includes an actuator such as a solenoid. The solenoid applies force to the pressure sensitive member, which determines the target pressure Pset. The target pressure Pset is altered by varying the force applied the solenoid through the external control procedure.

A compressor installed in a vehicle is normally actuated by power transmitted from the vehicle's engine. The compressor consumes a considerable amount of the engine power and increase the load on the engine. Accordingly, when the vehicle needs additional engine power, such as when the vehicle is being accelerated or ascending a sloped surface, the compressor displacement is minimized to reduce the load acting on the engine due to operation of the compressor. For example, the aforementioned variable displacement compressor adjusts the target pressure Pset to a value higher than the current target pressure Pset by means of the internal control valve having the solenoid. The current suction pressure Ps becomes thus relatively low as compared to the adjusted target pressure Pset. This minimizes the compressor displacement to minimize the load acting on the engine due to the operation of the compressor.

However, an analysis regarding the operation of the variable displacement compressor indicates that the above feedback control procedure does not always reduce the load acting on the engine sufficiently, if the target pressure Pset is adjusted in accordance with the suction pressure Ps.

FIG. 11 is a graph showing the relationship between the suction pressure Ps and the compressor displacement Vc. In the graph, the relationship is represented by curves. That is, the relationship between the suction pressure Ps and the compressor displacement Vc varies in accordance with the heat load acting on the evaporator. Thus, when the target pressure Pset is set to a pressure Ps1, the displacement achieved automatically by the internal control valve is varied within a certain range (for example, $\Delta vc$) in relation to the amount of the heat load acting on the evaporator.

For example, even though the target pressure Pset is raised in accordance with the current suction pressure PS, the displacement Vc is not lowered enough to reduce the load acting on the engine if the heat load on the evaporator is very high. In other words, as long as the target pressure Pset is adjusted in accordance with the current suction pressure Ps, the compressor displacement is not adjusted quickly to the desired value when the heat load acting on the evaporator is great.

As described above, as long as there is no need for reducing the load acting on the engine, controlling of the compressor displacement in accordance with the suction pressure Ps, which reflects the heat load on the evaporator, achieves the objective of the air-conditioning apparatus. That is, the air-conditioning apparatus maintains the temperature in the passenger compartment at a comfortable level regardless of the temperature of the ambient air. However, when the load acting on the engine must be reduced, the compressor displacement cannot be reduced quickly if it is controlled in accordance with the suction pressure Ps.

Accordingly, it is an objective of the present invention to provide an air-conditioning apparatus that quickly varies displacement of a compressor through an external control procedure when necessary, regardless of the heat load acting on an evaporator. It is also an objective of the present invention to provide a procedure for controlling a variable displacement compressor to adjust its displacement for maintaining the temperature in a passenger compartment at a comfortable level when there is no need to reduce the load acting on the engine and to quickly lower the displacement when the load acting on the engine must be reduced.

SUMMARY OF THE INVENTION

To achieve the above objective, the present invention is an air-conditioning apparatus having a refrigerant circuit including a condenser, a pressure reducing device, an evaporator, and a variable displacement compressor. The air-conditioning apparatus has a torque detecting device, an external information detecting device, and a control device. The torque detecting device directly or indirectly detects torque acting on the compressor during operation of the compressor. The external information detecting device detects various external information other than the torque. The control device determines a target torque in accordance with the external information provided by the external information detecting device. The control device executes a feedback control program for displacement of the compressor such that the torque detected by the torque detecting device approaches the target torque.

As described above, the air-conditioning apparatus of the present invention controls the compressor displacement in accordance with the torque acting on the compressor. Specifically, the feedback control program is performed for the compressor displacement such that the torque detected by the torque detecting device approaches the target torque, which is determined by the control device in accordance with the external information. In other words, the compressor displacement is controlled regardless of a physical magnitude, such as suction pressure, reflecting the heat load acting on the evaporator. The control of the compressor displacement is thus performed only in accordance with the torque acting on the compressor. Accordingly, the compressor displacement is varied quickly to reduce the torque acting on the compressor when necessary. As a result, although the feedback control procedure of the present invention maintains the passenger compartment temperature at a comfortable level when the vehicle is operated in a normal state, the feedback control procedure quickly varies the compressor displacement when the load acting on the engine must be reduced.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
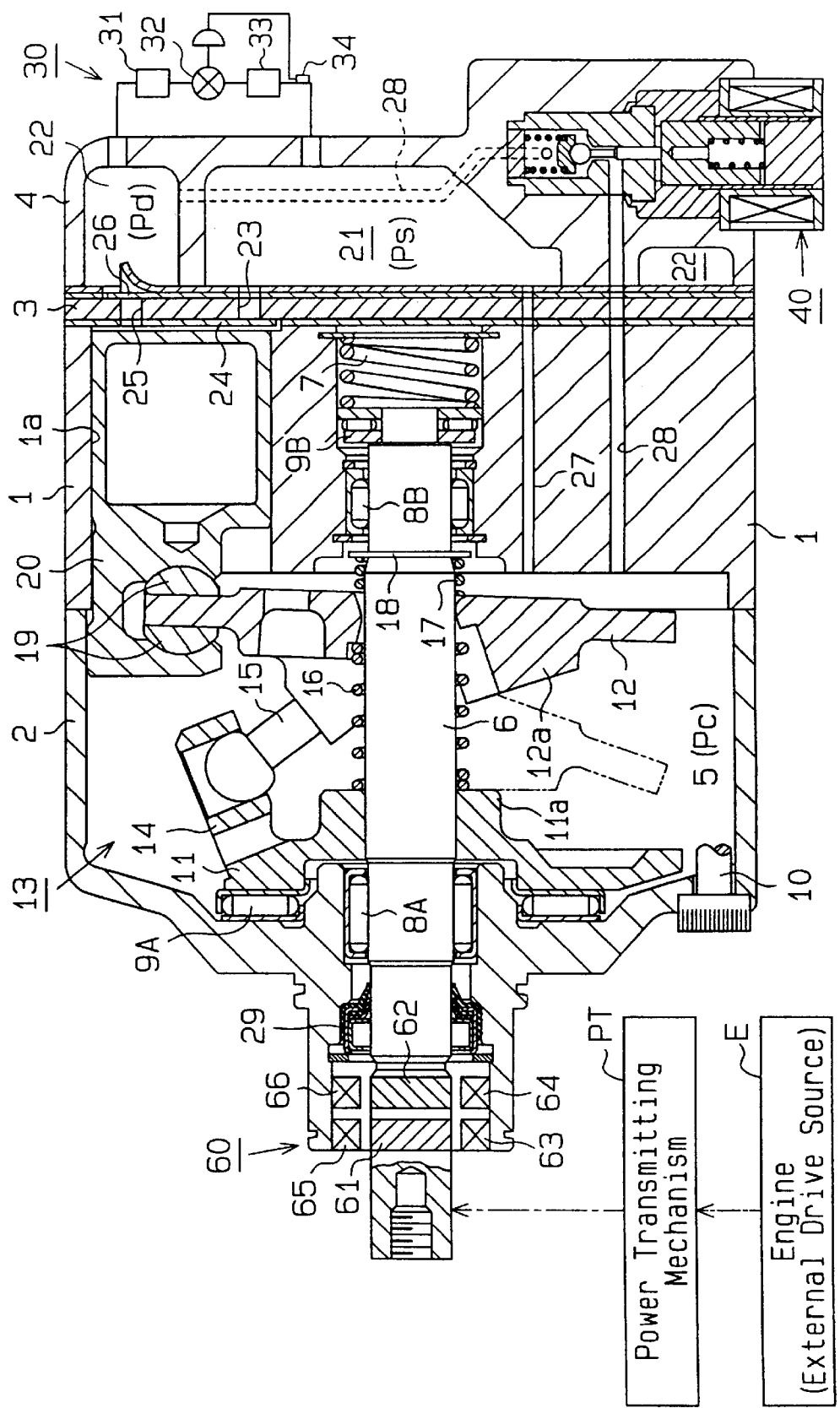
FIG. 1 is a cross-sectional view showing a variable displacement, swash-plate type compressor according to the present invention.

An embodiment of a vehicle air-conditioning apparatus according to the present invention will now be described with reference to FIGS. 1 to 10. As shown in FIG. 1, the air-conditioning apparatus has a refrigerating circuit (refrigerant circuit) including a variable displacement compressor and an external refrigerant circuit 30. The external refrigerant circuit 30 has, for example, a condenser 31, a thermal expansion valve 32, or a pressure reducing device, and an evaporator 33. A temperature sensor 34 is provided near the outlet of the evaporator 33, or downstream from the evaporator 33. The opening size of the expansion valve 32 is controlled by a feedback control procedure in accordance with the temperature detected by the temperature sensor 34 and the evaporation pressure in the evaporator (the pressure at the outlet of the evaporator). Accordingly, the expansion valve 32 supplies the evaporator 33 with liquid refrigerant in an amount corresponding to the heat load acting on the evaporator, thus adjusting the amount of the refrigerant flowing in the external refrigerant circuit 30. Refrigerant gas is supplied from a downstream portion of the external refrigerant circuit 30 to the compressor. The compressor compresses the refrigerant gas and sends the compressed refrigerant to an upstream portion of the external refrigerant circuit 30.

As shown in FIG. 1, the compressor includes a cylinder block 1, a front housing member 2, a valve plate 3, and a rear housing member 4. The front housing member 2 is coupled to one end of the cylinder block 1. The rear housing member 4 is connected to the other end of the cylinder block 1 through the valve plate 3. The cylinder block 1, the front housing member 2, the valve plate 3, and the rear housing member 4 are fastened to one another by a plurality of through bolts 10 (only one is shown in FIG. 1) to form a compressor housing. A crank chamber 5 is defined by the front housing member 2 and the cylinder block 1. A drive shaft 6 extends in the crank chamber 5 and is rotationally supported by a pair of radial bearings 8A, 8B. A spring 7 and a thrust bearing 9B are accommodated in a recess extending in the middle of the cylinder block 1. The spring 7 urges the thrust bearing 9B toward the front housing member 2. A lug plate 11 is fitted around the drive shaft 6 in the crank chamber 5 and rotates integrally with the drive shaft 6. A thrust bearing 9A is provided between the lug plate 11 and an inner wall of the front housing member 2. The drive shaft 6 and the lug plate 11, which rotate integrally, are positioned in a thrust direction by the thrust bearing 9A in the front housing member 2 and the thrust bearing 9B in the cylinder block 1.

One end of the drive shaft 6 projects from the front housing member 2, as shown in FIG. 1. A seal 29 is provided near the projecting end of the drive shaft and is fitted in a space between the surface of the drive shaft 6 and a corresponding cylindrical wall of the front housing member 2. The seal 29 thus seals the crank chamber 5 from the exterior of the compressor. A torque detector 60, which will be described later in detail, is provided between the projecting end of the drive shaft 6 and the seal 29. The projecting end of the drive shaft 6 is connected with an engine E, or an external drive source, through a power transmitting mechanism PT. The power transmitting mechanism PT may be a clutch mechanism (for example, an electromagnetic clutch) that is electrically and externally controlled to selectively transmit and block the engine power with respect to the compressor. Alternatively, the power transmitting mechanism PT may be a clutchless type (for example, a combination of a belt and a pulley) that always transmits the engine power to the compressor. The power transmitting mechanism PT of this embodiment is assumed to be a clutchless type.

As shown in FIG. 1, a swash plate 12, or a cam plate, is accommodated in the crank chamber 5. A hole is formed in the middle of the swash plate 12, and the drive shaft 6 extends through the hole. The swash plate 12 is connected to the lug plate 11 and the drive shaft 6 by a hinge mechanism 13, or a connecting and guiding mechanism. The hinge mechanism 13 includes a pair of support arms 14 (only one is shown in FIG. 1) and a pair of guide pins 15 (only one is shown in FIG. 1). The support arms 14 extend from a rear side, or the right side in FIG. 1, of. the lug plate 11. The guide pins 15 extend from a front side, or the left side in FIG. 1, of the swash plate 12. The support arms 14 and the guide pins 15 cooperate to move the swash plate 12. The swash plate 12 slides along the surface of the drive shaft 6. Accordingly, the swash plate 12 rotates integrally with the lug plate 11 and the drive shaft 6 and inclines with respect to the drive shaft 6 while axially sliding along the drive shaft 6. The swash plate 12 includes a counterweight 12a located opposite to the hinge mechanism 13 with respect to the drive shaft 6, as shown in FIG. 1.

An inclination angle reducing spring 16 is provided between the lug plate 11 and the swash plate 12. The inclination angle reducing spring 16 urges the swash plate 12 toward the cylinder block 1, or in a direction to reduce the inclination angle of the swash plate 12. A restoring spring 17 is fitted around the drive shaft 6 between the swash plate 12 and a restriction ring 18 secured to the drive shaft 6. When the swash plate 12 is maximally inclined (as indicated by the double-dotted chain line in FIG. 1), the restoring spring 17 applies no force to the swash plate 12 or any other members. However, when the swash plate 12 is minimally inclined (as indicated by the solid line in FIG. 1), the restoring spring 17 is compressed between the swash plate 12 and the restricting ring 18. In this state, the restoring spring 17 urges the swash plate 12 away from the cylinder block 1, or in a direction to increase the inclination angle of the swash plate 12. The length of the restoring spring 17 in a normal state and the position of the restricting ring 18 are selected such that the restoring spring 17 is not completely compressed even when the swash plate 12 is located at its minimum inclination angle $\theta$min (which is, for example, one to five degrees).

A plurality of cylinder bores 1a (only one is shown in FIG. 1) are formed around the drive shaft 6 in the cylinder block 1. The rear opening of each cylinder bore 1a, as viewed to the right in FIG. 1, is closed by the valve plate 3. Each cylinder bore 1a accommodates a single head piston 20, and the piston 20 moves in the cylinder bore 1a. A compression chamber is formed in each cylinder bore 1a. The volume of the compression chamber is altered by movement of the piston 20. The front side of each piston 20, as viewed to the left in FIG. 1, is connected to the periphery of the swash plate 12 through a pair of shoes 19. The shoes 19 enable the associated piston 20 to move when the swash plate 12 rotates. That is, when the swash plate 12 rotates integrally with the drive shaft 6, the rotation of the swash plate 12 is converted to linear movement of each piston 20 with a stroke corresponding to the inclination angle $\theta$ of the swash plate 12.

A suction chamber 21 is formed between the valve plate 3 and the rear housing member 4. A discharge chamber 22 is formed around the suction chamber 21 in the same space. The valve plate 3 includes a suction valve plate, a port plate, a discharge valve plate, and a retainer plate. Specifically, a plurality of suction ports 23, a plurality of suction valves 24 that open and close the associated suction ports 23, a plurality of discharge ports 25, and a plurality of discharge valves 26 that open and close the associated discharge ports 25, each corresponding to one cylinder bore 1a, are formed in the valve plate 3. The suction port 23 connects the suction chamber 21 to the associated cylinder bore 1a, and the discharge port 25 connects the discharge chamber 22 to the associated cylinder bore 1a. Refrigerant gas is drawn into the suction chamber 21 (zone of suction pressure Ps) from the outlet of the evaporator 33. When each piston 20 moves from the top dead center to the bottom dead center in the associated cylinder bore 1a, the refrigerant gas in the suction chamber 21 is supplied to the cylinder bore 1a through the associated suction port 23 opened by the associated suction valve 24. When the piston 20 moves from the bottom dead center to the top dead center in the cylinder bore 1a, the refrigerant gas in the cylinder bore 1a is compressed to a predetermined pressure. The compressed refrigerant gas is discharged to the discharge chamber 22 (zone of discharge pressure Pd) through the associated discharge port 25 opened by the associated discharge valve 26. The compressed refrigerant gas in the discharge chamber 22 is supplied to the condenser 31.

In this embodiment, the drive shaft 6 of the compressor is rotated by power transmitted from the engine E such that the swash plate 12 is rotated while inclined by a predetermined inclination angle $\theta$. Generally, the inclination angle $\theta$ is an angle defined between a plane that is perpendicular to the drive shaft 6 and the swash plate 12. When the swash plate 12 rotates, each piston 20 is moved by a stroke corresponding to the inclination angle $\theta$. In accordance with the movement of the piston 20, refrigerant gas is drawn into the associated cylinder bore 1a, compressed in the cylinder bore 1a, and discharged from the bore 1a, in a repeated manner.

The inclination angle $\theta$ of the swash plate 12 is determined by the equilibrium of various moments, such as a rotation moment due to centrifugal force produced by the swash plate, spring moment produced by the inclination angle reducing spring 16 (and the restoring spring 17), an inertia moment caused by the movement of the pistons 20, and a gas pressure moment. The gas pressure moment is determined in accordance with the relationship between the pressure in each cylinder bore 1a and the pressure in the crank chamber 5 (crank pressure Pc), which act on the associated sides of each piston 20. The gas pressure moment thus acts either in a direction to decrease or increase the inclination angle $\theta$ of the swash plate 12, in accordance with the crank pressure Pc. In this embodiment, a displacement control valve (electromagnetic valve) 40, which will be described later, adjusts the crank pressure Pc to vary the gas pressure moment as desired. The inclination angle $\theta$ of the swash plate 12 is thus selected in a range from the minimum inclination angle $\theta$min to the maximum inclination angle θmax. The maximum inclination angle θmax is determined by abutment between the counterweight 12a of the swash plate 12 and a restricting portion 11a of the lug plate 11. The minimum inclination angle θmin is determined mainly by the equilibrium of the force of the inclination angle reducing spring 16 and the force of the restoring spring.17 when the gas pressure moment is substantially maximized in the direction to decrease the inclination angle θ.

(Mechanism For Controlling Crank Pressure/Swash Plate Inclination Angle)

Figure 2:
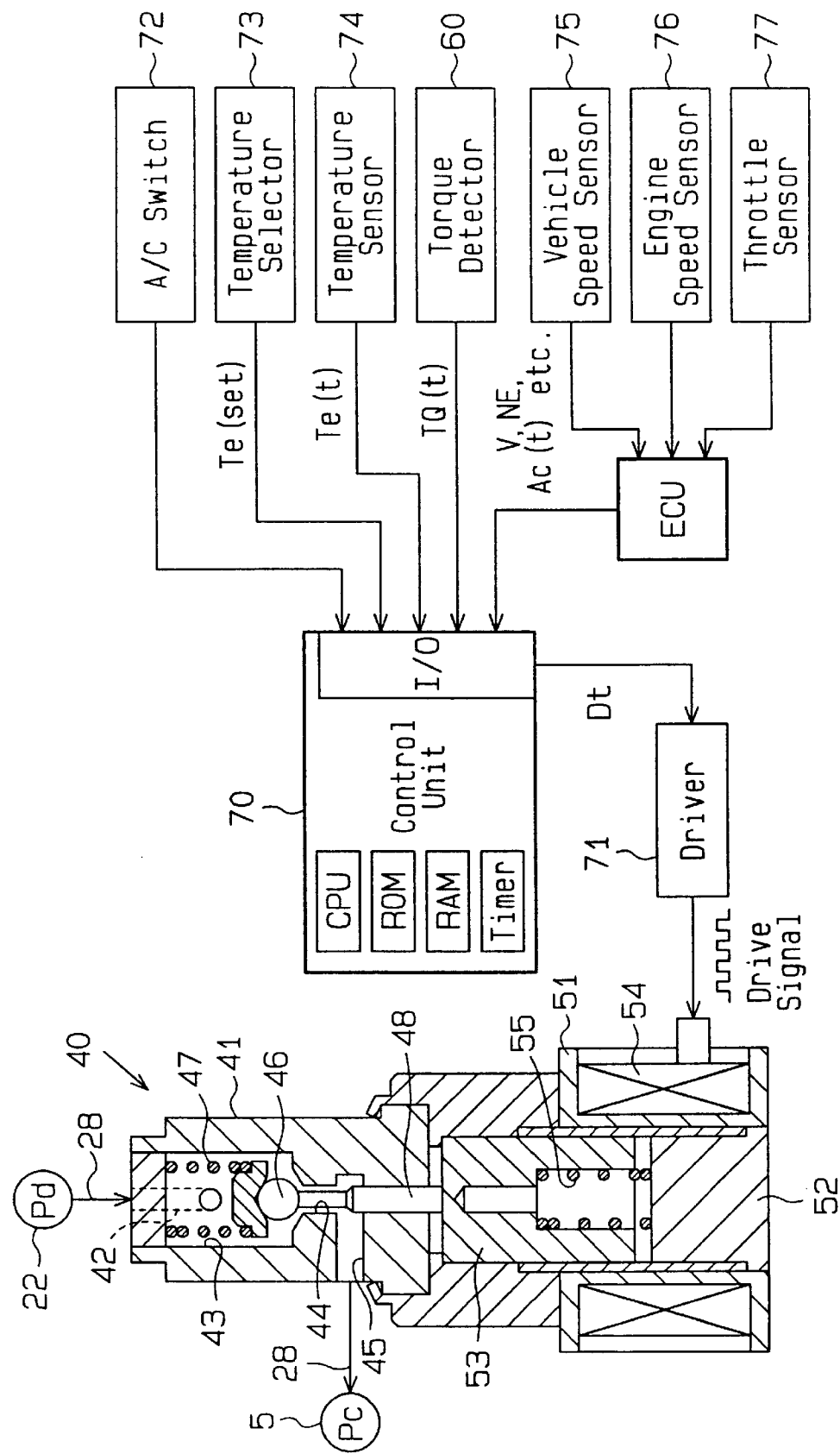
FIG. 2 is an enlarged cross-sectional view showing a displacement control valve of FIG. 1 and a block diagram showing a control procedure for the displacement control valve.

A mechanism for controlling the crank pressure Pc, or the inclination angle θ of the swash plate 12, includes a bleeding passage 27 and a supply passage 28, which are formed in the compressor of FIG. 1, and the displacement control valve 40 shown in FIGS. 1 and 2. The bleeding passage 27 connects the suction chamber 21 to the crank chamber 5, and the supply passage 28 connects the discharge chamber 22 to the crank chamber 5. The displacement control valve 40 is provided in the supply passage 28. The opening size of the control valve 40 is adjusted to alter the flow rate of the refrigerant gas flowing in the supply passage 28 and that of the refrigerant gas flowing in the bleeding passage 27, thus varying the crank pressure Pc. This alters the difference between the crank pressure Pc and the pressure in each cylinder bore 1a, which act on the associated sides of each piston 20. Accordingly, the inclination angle θ of the swash plate 12 is changed to alter the piston stroke, or the compressor displacement. The bleeding passage 27 and the supply passage 28 are part of a refrigerant circuit connecting the suction chamber 21, the crank chamber 5, and the discharge chamber 2 to one another.

As shown in FIG. 2, the displacement control valve 40 has a valve portion 41 and a solenoid portion 51. The valve portion 41 has an inlet port 42, a valve chamber 43, a valve hole 44, and an outlet port 45, which are parts of the supply passage 28. The valve chamber 43 accommodates a valve body 46 and a closing spring 47. The valve body 46 selectively opens and closes the valve hole 44, and the closing spring 47 presses the valve body 46 in a direction to close the valve hole 44. The solenoid portion 51 includes a fixed iron core 52, a movable iron core 53, a coil 54, and an opening spring 55. The coil 54 is located around the fixed core 52 and the movable core 53. A rod 48 connects the movable core 53 to the valve body 46. The opening spring 55 has a force greater than that of the closing spring 47. That is, regardless of the force produced by the closing spring 47, the opening spring 55 urges the valve body 46 to open the valve hole 44 through the movable core 53 and the rod 48. The solenoid portion 51 is excited when an electric current is supplied from an external source to the coil 54. When the solenoid portin 51 is excited, electromagnetic force is produced between the fixed core 52 and the movable core 53, thus attracting the cores 52, 53 to one another. The electromagnetic force generated by the coil 54 acts in the same direction as the force of the closing spring 47. That is, the electromagnetic force and the force of the opening spring 55 act in opposite directions. Accordingly, the position of the valve body 46 with respect to the valve hole 44 (the opening size of the displacement control valve 40) is determined by the equilibrium between these opposing forces. The electromagnetic force between the cores 52, 53 is altered in accordance with the current supplied to the coil 54. The opening size of the displacement control valve 40 is thus adjusted between zero percent and 100 percent by adjusting the current supplied to the coil 54. The electric current supply to the coil 54 may be controlled in an analog manner, by a duty control procedure, or by a PWM (Pulse Wave Modulation) control procedure. In this embodiment, the electric current supply to the coil 54 is controlled by the duty control procedure. That is, a duty ratio is varied when supplying the coil 54 with current. As the duty ratio Dt is decreased, the opening size of the-displacement 25 control valve 40 is increased. As the duty ratio Dt is increased, the opening size of the displacement control valve 40 is decreased.

(Torque Detector)

Figure 3:
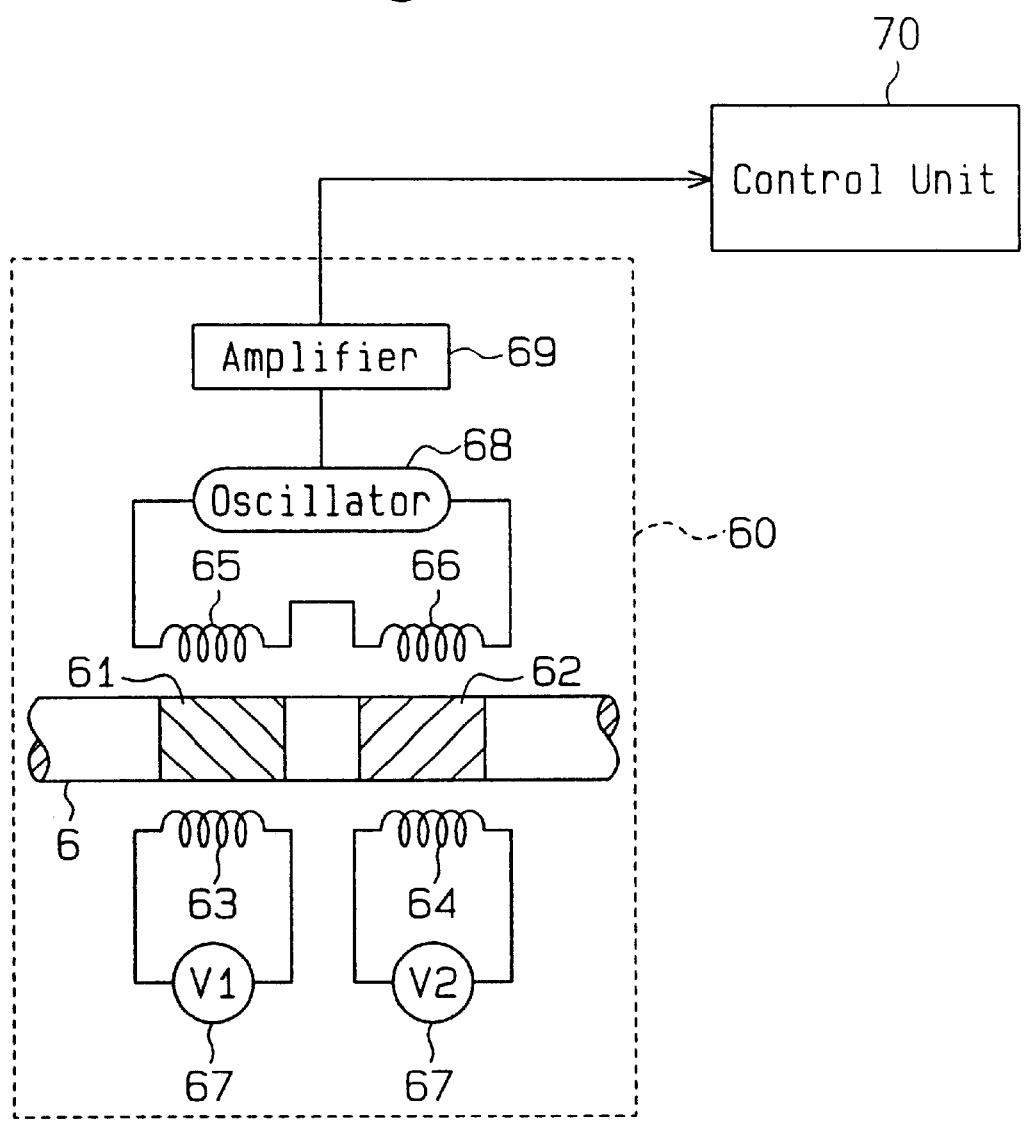
FIG. 3 is a circuit diagram of a torque detector according to the present invention.

As shown in FIG. 1, the torque detector 60 is provided between the projecting end of the drive shaft 6 and the seal 29. The torque detector 60 is a non-contact type of torque detector. As shown in FIGS. 1 and 3, the torque detector 60 includes a pair of magnetic films 61, 62, a pair of primary coils 63, 64, a pair of secondary coils 65, 66, a voltage supply circuit 67, an oscillator 68, and an amplifier (amplifying circuit) 69. The magnetic films 61, 62 each have a plurality of parallel, slanted grooves. The primary coils 63, 64 are secured to the inner circumferential wall of the front housing member 2 near the projecting end of the drive shaft 6. Each primary coil 63, 64 faces the associated magnetic film 61, 62. A predetermined voltage (V1, V2) is supplied to the primary coil 63, 64 through the voltage supply circuit 67. The secondary coils 65, 66 are also secured to the inner circumferential wall of the front housing member 2 near the projecting end of the drive shaft 6. The secondary coils 65, 66 are opposed to the primary coils 63, 64. As shown in FIG. 3, the oscillator 68 is connected to the secondary coils 65, 66. The amplifier 69 connects the oscillator 68 to a control unit 70 of the vehicle air-conditioning apparatus. The magnetic films 61, 62 and the primary and secondary coils 63, 64, 65, 66 form a magnetostriction detecting portion of the torque detector for detecting magnetostriction in the vicinity of the projecting end of the drive shaft 6.

When the drive shaft 6 is rotated by the engine E, torque acts on the drive shaft 6 as a reaction to operation of the compression. The torque acts in a direction opposite to the rotating direction of the drive shaft 6. Magnetostriction is thus produced on the magnetic films 61, 62 in accordance with the amount of torque acting on the drive shaft 6. The voltages V1, V2 supplied to the primary coils 63, 64 are thus changed by amounts ΔV1, ΔV2. The total of the voltage change amounts (ΔV1+ΔV2) is detected by the secondary coils 65, 66. The oscillator 68 then outputs a frequency signal corresponding to the voltage change amount reflecting the amount of the torque acting on the drive shaft 6. In other words, when the compressor is operating, the torque detector 60 detects the amount of torque acting on the drive shaft 6 and outputs an electric signal indicating a detection result.

(Control System)

The air-conditioning system of this embodiment is controlled by the control unit 70. As shown in FIG. 2, the control unit 70 includes a central processing unit (CPU), a read only memory (ROM), a random access memory (RAM), a timer, and an input/output device. The control unit 70 operates in a similar manner as a computer. The ROM of the control unit 70 stores various programs (see the flowcharts of FIGS. 4 to 9), which will be described later, and initial data. The RAM memory of the control unit 70 provides for an operational memory region. The timer measures time when instructed by the CPU and informs the CPU of a certain time 40 period elapsed. The input/output device is an input/output circuit for the control unit 70 and has a plurality of input terminals and output terminals. A driver 71 is connected to the output terminals of the input/output device. The driver 71 sends a drive signal, which is generated through a duty control procedure, to the coil 54 of the displacement control valve 40, when instructed by the control unit 70.

Other than the torque detector 60, the input terminals of the input/output device are connected to at least an A/C switch 72, a temperature selector 73, a temperature sensor 74, and an electronic control unit (ECU). The A/C switch 72 is manipulated by the vehicle operator or a passenger to selectively activate and de-activate the air-conditioning apparatus. The A/C switch 72 provides the control unit 70 with information regarding the operational state of the air-conditioning system. The temperature selector 73 is also manipulated by the operator or a passenger to select a desired target temperature Te(set) for the passenger compartment. The temperature selector 73 provides the control unit 70 with information regarding the target temperature Te(set). The temperature sensor 74 is provided in the vicinity of the evaporator 33 and detects the temperature of the air drawn in from the passenger compartment that has been cooled (subjected to heat exchange) by the evaporator 33. The temperature sensor 74 sends signals regarding the detected temperature Te(t) in the passenger compartment to the control unit 70. The torque detector 60 provides the control unit 70 with signals regarding the torque TQ(t) acting on the drive shaft 6 of the compressor.

Although the temperature of the air that has been cooled by the evaporator 33 is detected by the temperature sensor 74 in this embodiment, other physical measurements that vary in relation to the temperature in the passenger compartment may be taken. That is, for example, the pressure of the refrigerant that has passed through the evaporator 33 may be detected.

The ECU controls the vehicle's engine and is connected to a vehicle speed sensor 75, an engine speed sensor 76, and a throttle angle sensor 77. The throttle angle sensor 77 detects the position, or an angle (opening size) of a throttle valve provided in an intake manifold. The angle (opening size) of the throttle valve corresponds to the dgree of depression of the accelerator pedal. In other words, the ECU provides the control unit 70 with information regarding the operational state of the vehicle, such as the vehicle speed V, engine speed NE, and the position of the throttle Ac(t), which is determined in accordance with the accelerator pedal depression. The A/C switch 72, the temperature selector 73, the temperature sensor 74, the vehicle speed sensor 75, the engine speed sensor 76, the throttle angle sensor 77, and the ECU together form an external information collecting device.

The control unit 70 determines the current state of the vehicle in accordance with the information provided by the external information collecting device. The control unit 70 thus computes a duty ratio Dt for the drive signal supplied by the driver 71 to the coil 54 of the displacement control valve 40. The control unit 70 then instructs the driver 71 to output the drive signal in accordance with the computed duty ratio Dt, thus adjusting the opening size of the displacement control valve 40. This quickly alters the crank pressure Pc and the piston stroke, or the compressor displacement and the torque acting on the drive shaft 6.

Figure 4:
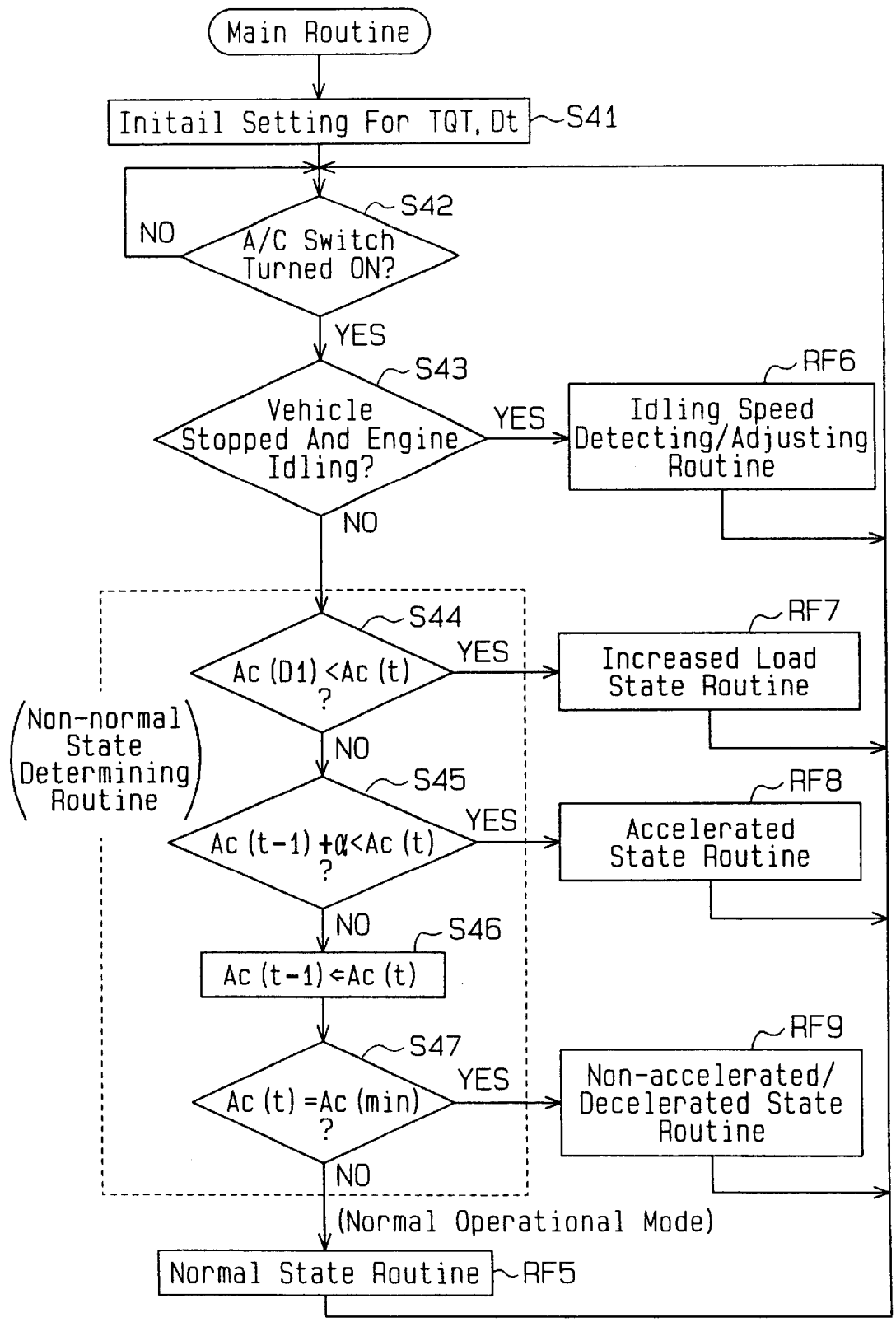
FIG. 4 is a flowchart showing a main routine of a procedure for controlling compressor displacement, or torque acting on the compressor, according to the present invention.

The duty control procedure executed by the control unit 70 will now be described in detail with reference to the flowcharts of FIGS. 4 to 9. These flowcharts show routines for controlling the compressor displacement and the torque acting on the drive shaft 6. FIG. 4 shows a main routine of an air-conditioning program, or a base of the program.

FIGS. 5 to 9 show subroutines executed when a certain condition is satisfied during the main routine.

(Main Routine)

When the vehicle's ignition switch (starting switch) is turned on, power is supplied to the ECU and the control unit 70. The ECU and the control unit 70 thus start to operate. The control unit 70 initially sets various data in step S41 (hereinafter referred to as "S41", and other steps will be referred to in a similar manner), as shown in FIG. 4. Specifically, for example, the control unit 70 sets an initial value or a tentative value for a target torque TQT and a duty ratio Dt. The target torque TQT is a target value when executing a feedback control procedure for the torque TQ(t), which will be described later. After completing the initial setting in S41, subsequent steps are performed as shown in FIG. 4. That is, the vehicle's operational state is monitored, and the duty ratio Dt is internally computed.

In S42, the activation state of the A/C switch 72 is monitored until the A/C switch 72 is turned on. When the A/C switch 72 is turned on, the control unit 70 judges whether the vehicle is stopped and the engine E is idling in S43. In other words, the control unit 70 judges whether the vehicle speed V is zero and the engine speed NE is greater than zero. If the result is negative in S43, a non-normal state determining routine (S44 to S47) is initiated. If the result is positive, an idling speed detecting and adjusting routine RF6 (see FIG. 6), which will be described later, is executed. In S43, the result becomes positive when the vehicle speed V is greater than zero even if the engine power is not being transmitted to the steered wheels (due to disengagement of the clutch).

In a first step of the non-normal state determining routine, or S44, it is determined whether the current through actuation amount Ac(t) is greater than a first throttle actuation determining value Ac(D1). Specifically, it is judged whether the throttle actuation amount Ac(t) is greater than a normal actuation amount. The normal actuation amount represents the throttle position when the vehicle is in an ordinary load state, or when the vehicle is traveling along a flat surface at a constant speed. The result becomes positive when, for example, the vehicle ascends a sloped surface. In this manner, the control unit 70 indirectly detects an increased load state of the engine in S44. Accordingly, the first determining value Ac(D1) is selected as 80 to 90% of the maximum accelerator actuation amount. If the result is positive in S44, or the engine is in an increased load state, an increased load state routine RF7 (see FIG. 7) is executed. The routine RF7 will be described later.

In the second step of the non-normal state determining routine, or S45, it is determined whether the current throttle actuation amount Ac(t) is greater than a total of a previous throttle actuation amount Ac(t−1) and an acceptable increase amount α. The result of S45 becomes positive if the throttle actuation amount Ac(t) is increased by an amount greater than the acceptable increase amount a during a time period between completion of S44 and initiation of S45. This enables the control unit 70 to indirectly detect rapid acceleration of the vehicle, which may occur, for example, when passing another vehicle. The acceptable increase amount a enables the control unit 70 to distinguish between unintentional and intentional depression of the accelerator total. If the result of S45 is positive, or when rapid acceleration is required, an accelerated state routine RFB (see FIG. 8), which will be described later, is executed. If the result of S45 is negative, the control unit 70 executes S46. In S46, the current throttle actuation amount Ac(t), which was used in S45 is stored as a new previous throttle actuation amount Ac(t−1) for subsequent execution of S45.

In the third step of the non-normal state determining routine, or S47, it is determined whether the current throttle actuation amount Ac(t) is a minimum throttle actuation amount Ac(min). The minimum throttle actuation amount Ac(min) is the minimum actuation amount that does not cause the engine to stall. The throttle acutation amount reaches the minimum at least when the driver does not depress the accelerator pedal at all. In other words, it is judged whether the degree of depression of the accelerator pedal is zero in S47. The control unit 70 thus indirectly detects a decelerated/non-accelerated state of the vehicle when, for example, the vehicle is descending a sloped surface. If the result of S47 is positive, or the vehicle is in a non-accelerated or decelerated state, a non-accelerated/decelerated state routine RF9 (see FIG. 9), which will be described later, is executed.

If the judgement result of S47 is negative, no judgement result is positive in the non-normal state determining routine. That is, the vehicle is not in an increased load state or an accelerated state or a decelerated state. The vehicle is thus determined to be in a normal operational state. In other words, if no positive judgement is made in the non-normal state determining routine, the vehicle is assumed to be operating in a normal state. After a negative judgment is made in S47, a normal state routine RF5 (see FIG. 5) is performed. In most cases, after completing the normal state routine RF5, the operation of the control unit 70 returns to S42 of the main routine in FIG. 4.

(Normal State Routine RF5)

Figure 5:
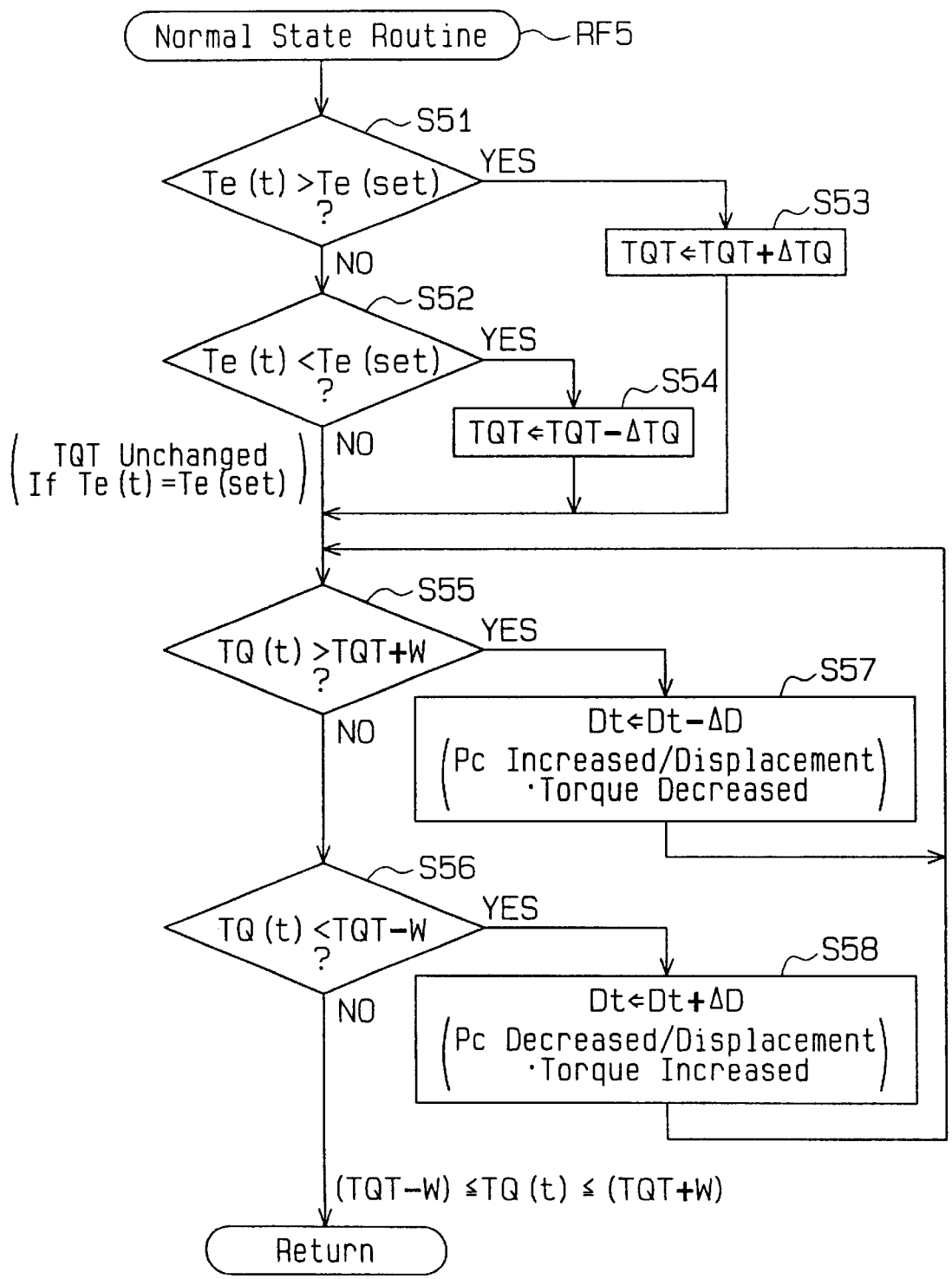
FIG. 5 is a flowchart showing a normal state routine of the control procedure according to the present invention.

When the vehicle is operated in a normal state, a feedback control procedure is executed for the cooling output of the air-conditioning apparatus, or compressor displacement, in accordance with the normal state routine RF5 shown in FIG. 5. Specifically, in steps from S51 to S54, the target torque TQT is reviewed or re-selected. In steps from S55 to S58, a feedback control procedure is performed for the duty ratio Dt such that the torque TS(t) currently acting on the drive shaft 6 of the compressor approaches the target torque TQT. That is, in steps S55 to S58, the feedback control procedure is executed for the crank pressure Pc, the compressor displacement, and the torque.

In S51, the control unit 70 judges whether the temperature in the vicinity of the evaporator Te(t), which is detected by the temperature sensor 74, is greater than the target temperature Te(set) selected with the temperature selector 73. If the result is negative, the control unit 70 judges whether the detected temperature Te(t) is smaller than the target temperature Te(set) in S52. If the result of S52 is also negative, the detected temperature Te(t) is equal to the target temperature Te(set). It is thus not necessary to alter the target torque TQT, which varies the cooling capacity of the air-conditioning apparatus. However, if the result of S51 is positive, it is assumed that the heat load acting on the evaporator is relatively large. In this case, the target torque TQT is increased by an amount ΔTQ in S53. The increased target torque TQT increases the displacement, thus improving the cooling capacity of the air-conditioning apparatus. If the result of S52 is positive, it is assumed that the heat load acting on the evaporator is relatively small. In this case, the target torque TQT is decreased by an amount ΔTQ in S54. The decreased target torque TQT reduces the displacement, thus lowering the cooling capacity of the air-conditioning apparatus. In this manner, the target torque TQT is reviewed and re-selected in the steps from S51 to S54.

Subsequently, in S55, the control unit 70 judges whether the torque detected by the torque detector 60 TQ(t) is greater than the total of the target torque TQT and an acceptable margin W. If the result is negative in S55, the control unit 70 judges whether the detected torque TQ(t) is smaller than the difference between the target torque TQT and the acceptable margin W in S56. If the results are both negative in S55 and S56, the current torque TQ(t) falls within a range between the value (TQT−W) and the value (TQT+W). In other words, the torque TQ(t) is currently in an acceptable range defined by twice the acceptable margin (2×W) with respect to the target torque TQT. In this case, it is not necessary to vary the duty ratio Dt, or torque and compressor displacement. Thus, the control unit 70 terminates the normal state routine RF5 without instructing the driver 71 to vary the duty ratio Dt. In the normal state routine RF5, the accuracy of controlling the torque TQ(t), or hunting level, is altered by changing the acceptable margin W.

If the judgement of S55 is positive, the control unit 70 decreases the duty ratio Dt by an amount ΔD in S57. The control unit 70 then instructs the driver 71 to change the current duty ratio to the new duty ratio (Dt−ΔD). This reduces the electric magnetic force produced by the coil 54 of the displacement control valve 40. The opening size of the displacement control valve 40 is thus increased correspondingly (the flow rate of the refrigerant flowing in the bleeding passage 28 is increased). Accordingly, the crank pressure Pc is raised, which increases the difference between the crank pressure Pc and the pressure in each cylinder bore 1a. The swash plate 12 is thus moved in a direction to reduce the inclination angle, thus decreasing the compressor displacement and the torque acting on the drive shaft 6. If the judgement of S55 is negative and the judgement of S56 is positive, the control unit 70 increases the duty ratio Dt by the amount ΔD in S58. The control unit 70 then instructs the driver 71 to change the current duty ratio to the new duty ratio (Dt+ΔD). This increases the electric magnetic force produced by the coil 54 of the displacement control valve 40. The opening size of the displacement control valve 40 is thus decreased correspondingly (the amount of the refrigerant flowing in the bleeding passage 28 is reduced). Accordingly, the crank pressure Pc is lowered to reduce the difference between the crank pressure Pc and the pressure in each cylinder bore 1a, which act on the associated sides of each piston 20. The swash plate 12 is thus moved in a direction to increase the inclination angle, thus increasing the compressor displacement and the torque acting on the drive shaft 6. As described above, the torque TQ(t) is adjusted to approach the target torque TQT by executing the feedback control procedures in S57 and/or S58, even when the difference between the detected torque TQ(t) and the target torque TQT is relatively large.

Figure 10:
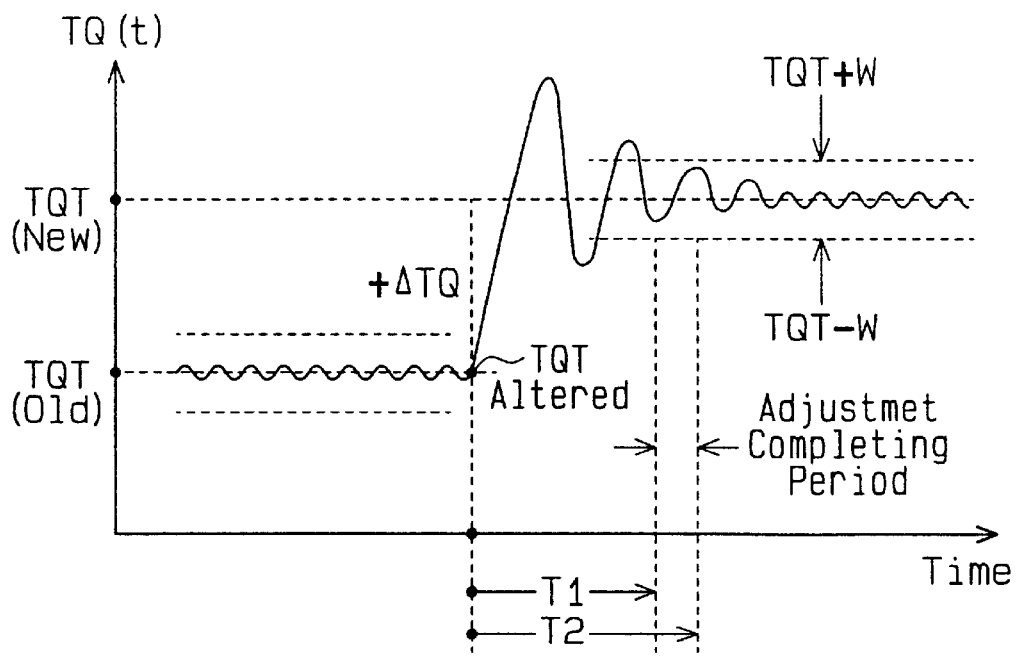
FIG. 10 is a timing chart showing an example of torque variation during the control procedure according to the present invention.
Figure 11:
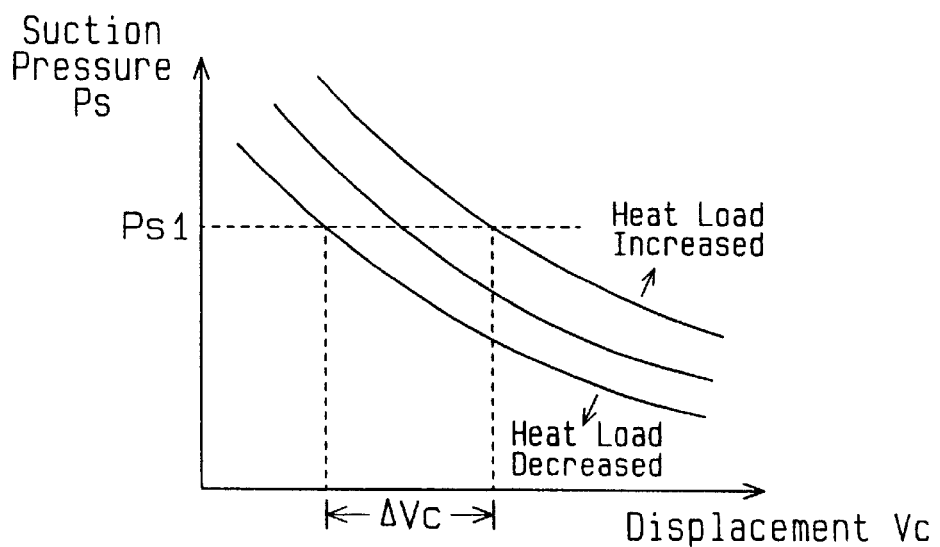
FIG. 11 is a graph showing the relationship between suction pressure and displacement in a prior art compressor.

FIG. 10 is a timing chart showing variation in the torque TQ(t) while executing the steps from S55 to S58 after increasing the target torque TQT in S53. As shown in FIG. 10, after a previous target torque TQT(Old) is altered to a corrected target torque TQT(New), a time period T1, or a time period T2, is required for increasing the TQ(t) to a value close to the corrected target torque TQT(New). In this embodiment, no measurement of pressure, such as the suction pressure Ps, which is affected by the heat load of the air-conditioning apparatus, is used as a parameter for the feedback control procedure. Instead, the torque TQ(t) is directly controlled by altering the duty ratio of the displacement control valve 40 in accordance with the procedure of the present invention. Since the torque TQ(t) responds quickly to alteration of the duty ratio of the displacement control valve 40, the time period T1, or the time period T2, is relatively short. In other words, the torque TQ(t) is adjusted to a value close to the target torque TQT in a relatively short time, and the normal state routine RF5 is terminated.

(Idling Speed Detecting and Adjusting Routine RF6)

Figure 6:
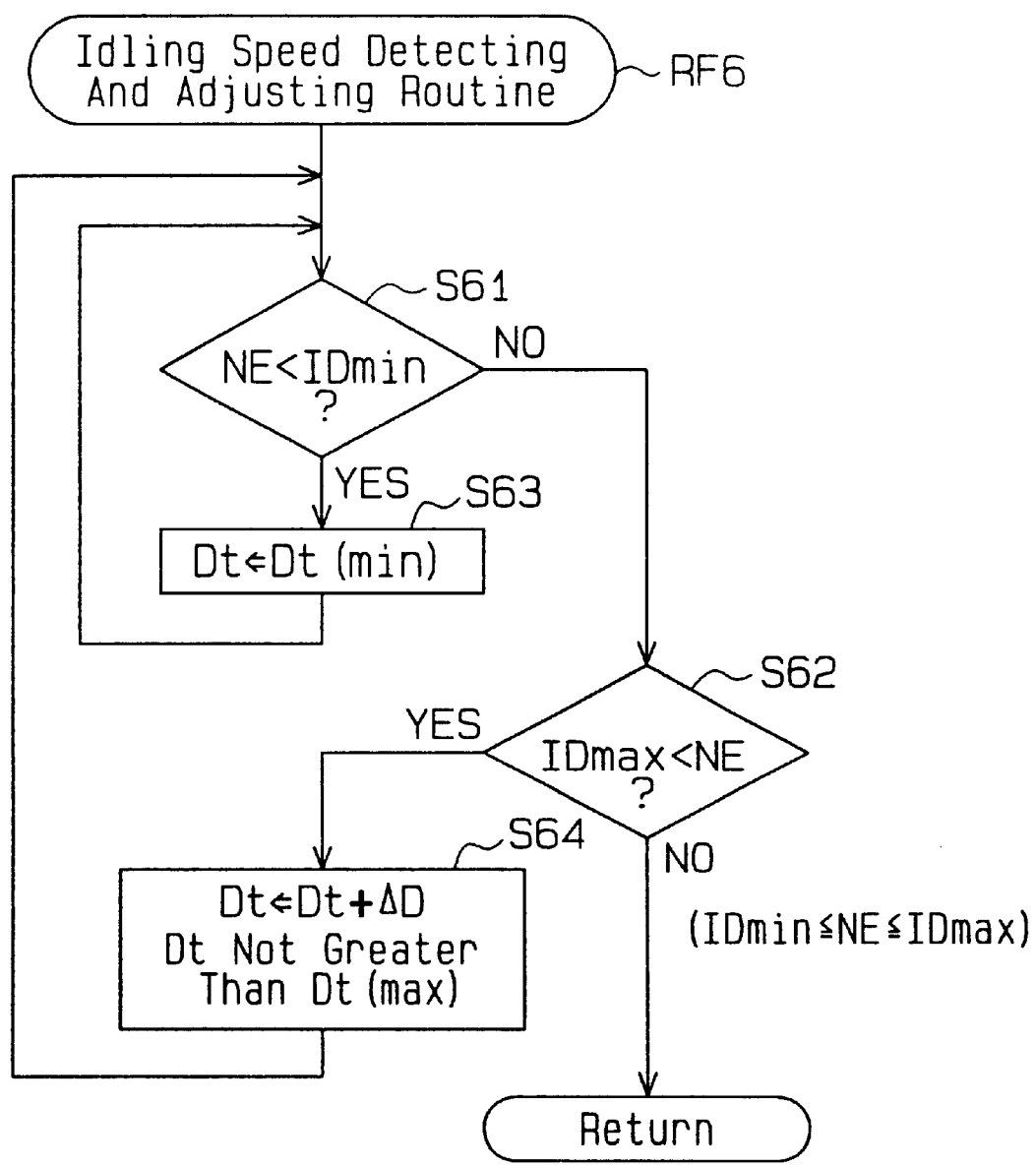
FIG. 6 is a flowchart showing an idling speed detecting and adjusting routine of the control procedure according to the present invention.

If the judgement of S43 in the main routine of FIG. 4 is positive, the control unit 70 performs the idling speed detecting and adjusting routine RF6 of FIG. 6. In the routine RF6, the engine idling speed is detected and then adjusted if necessary. Specifically, the control unit 70 judges, in S61, whether the engine speed NE obtained from the ECU is smaller than a minimum acceptable idling speed IDmin. If the judgement of S61 is negative, the control unit 70 judges whether the engine speed NE is greater than a maximum acceptable idling speed IDmax in S62. If the judgement result of S62 is negative, the engine speed NE is assumed to fall within an acceptable idling speed range between the value IDmin and the value IDmax. It is thus unnecessary to alter the duty ratio Dt, and the control unit 70 resumes the main routine.

If the judgement of S61 is positive, it is assumed that the engine speed NE is very low and that the engine is in an unstable state. In this case, the control unit 70 reduces the duty ratio Dt to a minimum duty ratio Dt(min). This minimizes the torque acting on the drive shaft 6 of the compressor, thus decreasing the load applied to the engine by the compressor. Accordingly, the engine speed NE is increased. If the judgement of S61 is negative and the judgement of S62 is positive, the engine speed NE is assumed to be very high. In this case, the control unit 70 increases the duty ratio Dt by the amount $\Delta D$ in S64 such that the increased duty ratio Dt does not exceed the maximum duty ratio Dt(max). This correspondingly increases the torque acting on the drive shaft 6 of the compressor, thus increasing the load applied to the engine by the compressor. Accordingly, the engine speed NE is decreased. In this manner, the engine speed NE is stabilized even though the engine is directly connected to the compressor. As described above, the idling speed detecting and adjusting routine RF6 stabilizes the idling speed of the engine E by adjusting the torque acting on the compressor, even immediately after the engine E is started.

(Increased Load State Routine RF7)

Figure 7:
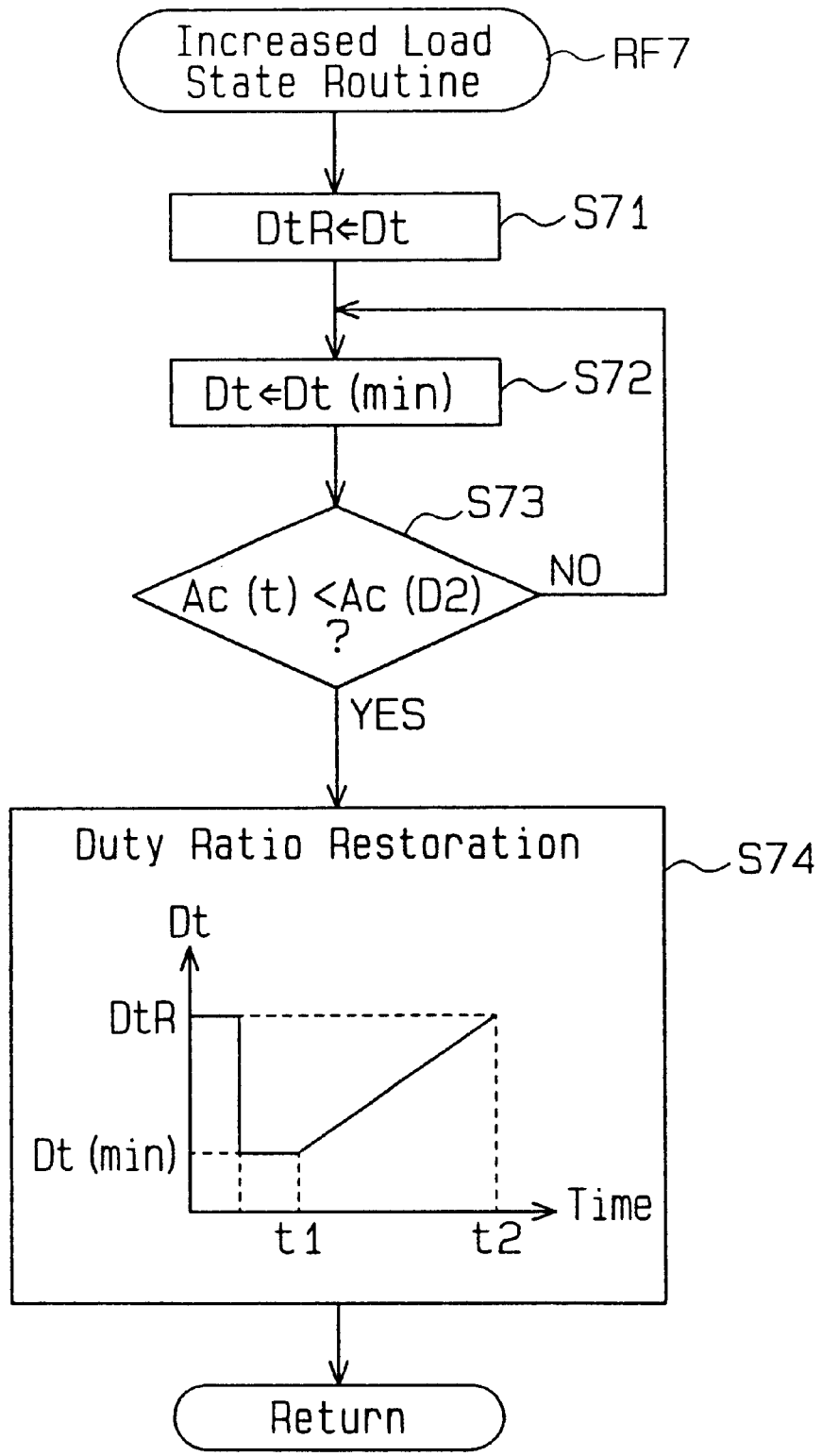
FIG. 7 is a flowchart showing an increased load state routine of the control procedure according to the present invention.

If the judgement of S44 in the main routine of FIG. 4 is positive, the control unit 70 executes an increased load state routine RF7 of FIG. 7. In the routine RF7, the control unit 70 first stores a current duty ratio Dt as a target restoration value DtR in S71 (preparatory step). The value DtR is a target value for a duty ratio restoring step, or S74, which will be described later. After completing S71, the control unit 70 lowers the current duty ratio Dt to the minimum duty ratio Dt(min) in S72. The control unit 70 then instructs the driver 71 to operate the displacement control valve 40 in accordance with the minimum duty ratio Dt(min). Subsequently, the control unit 70 judges whether the current throttle actuation amount Ac(t) is smaller than a second throttle actuation determining value Ac(D2) in S73. The second determining value Ac(D2) is smaller than the first determining value Ac(D1). Thus, if-the judgement of S73 is positive, it is assumed that the throttle actuation amount Ac(t) has become smaller, or the engine is no longer in an increased load state. In this embodiment, two determinating values, or the first determining value Ac(D1) and the second determinating values Ac(D2), are employed to perform a hysteresis control procedure for the throttle actuation amount Ac(t). By using the two determining values, hunting caused by using a single determining value is avoided. If the judgement of S73 is negative, the duty ratio Dt is maintained as the minimum duty ratio Dt(min). Accordingly, the opening size of the displacement control valve 40 remains maximum, thus increasing the crank pressure Pc. In other words, when the engine is in an increased load state, the compressor displacement and the torque are minimized to reduce the load applied to the engine.

When the judgement of S73 is positive, or when the engine is no longer in an increased load state, the duty ratio restoring step, or S74, is performed. Specifically, in S74, the control unit 70 gradually raises the current duty ratio Dt(t), which has been reduced to the minimum duty ratio Dt(min), to the target restoration value DtR (the duty ratio immediately before RF7 is initiated). As shown in the graph in S74 of FIG. 7, after a positive judgement is made in S73 at a time t1, the duty ratio Dt is gradually increased to the target value DtR in a substantially linear manner in a certain time period (t2–t1). This prevents the inclination angle of the swash plate 12 from being rapidly altered to cause an impact. When the duty ratio Dt achieves the target value DtR, the increased load state routine RF7 is terminated, and the control unit 70 resumes the main routine of FIG. 4.

(Accelerated State Routine RF8)

Figure 8:
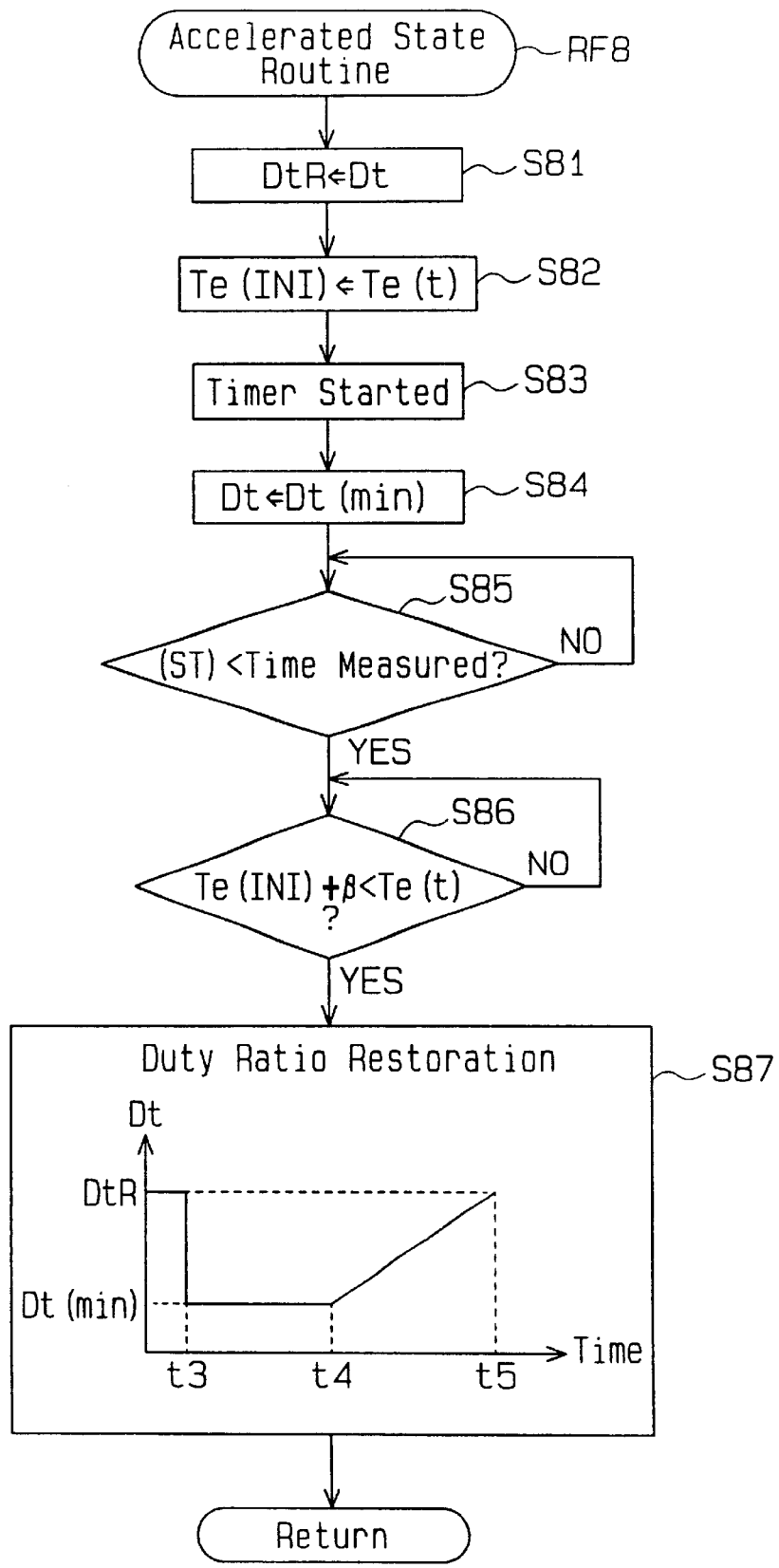
FIG. 8 is a flowchart showing an accelerated state routine of the control procedure according to the present invention.

If the judgement result of S45 in the main routine of FIG. 4 is positive, the control unit 70 executes an accelerated state routine RF8 of FIG. 8. In the routine RF8, the control unit 70 first stores a current duty ratio Dt as a target restoration value DtR in S81 (preparatory step). The value DtR is a target value for a duty ratio restoring step, or S87, which will be described later. Subsequently, in S82, the control unit 70 stores the currently detected temperature Te(t) as an initiating temperature Te(INI) for reducing the load acting on the engine when the vehicle is being accelerated. Next, the control unit 70 starts an internal timer in S83 and reduces the duty ratio Dt to the minimum duty ratio Dt(min) in S84. The control unit 70 then instructs the driver 71 to operate the displacement control valve 40 in accordance with the minimum duty ratio Dt(min). This maximizes the opening size of the displacement control valve 40 (the displacement control valve 40 becomes fully open), thus increasing the crank pressure Pc. Subsequently, in S85, the control unit 70 judges whether the time measured by the internal timer exceeds a predetermined time ST. If the judgement of S85 is negative, the duty ratio Dt is maintained as the minimum duty ratio Dt(min). That is, the displacement control valve 40 is maintained in a fully open state at least until the predetermined time ST elapses after the timer is started. The compressor displacement and the torque acting on the compressor are thus reliably minimized. That is, the load acting on the engine is reliably reduced (minimized) at least for the predetermined time ST when the vehicle is accelerated. The predetermined time ST need not be long, since acceleration normally takes place only temporarily.

After the time measured by the timer exceeds the predetermined time ST, the control unit 70 judges, in S86, whether the currently detected temperature Te(t) is greater than a total of the initiating temperature Te(INT) and an acceptable increase amount $\beta$. If the judgement of S86 is positive, it is assumed that the current temperature Te(t) has been increased by a greater degree than the acceptable increase amount $\beta$ during the predetermined time ST. In this case, it is necessary to immediately increase the cooling output of the air-conditioning apparatus. Specifically, the duty ratio restoring step, or S87, is executed. This step gradually raise the duty ratio Dt to the target duty ratio DtR, like the corresponding step of FIG. 7, or S74. The rapid alteration of the swash plate's inclination is thus avoided. In the graph shown in S87 of FIG. 8, after a positive judgement is made in S86 at a time t4, the duty ratio Dt achieves the target duty ratio DtR at a time t5. In other words, the duty ratio Dt increases to the target duty ratio DtR in a substantially linear manner in a certain time period (t5–t4). In the graph of S87, the time period (t4–t3) corresponds to a total of the predetermined time ST and the time consumed by the negative judgement repeated in S86. When the duty ratio Dt achieves the target duty ratio DtR, the routine RF8 is terminated, and the control unit 70 resumes the main routine of FIG. 4.

(Non-accelerated/Decelerated State Routine RF9)

Figure 9:
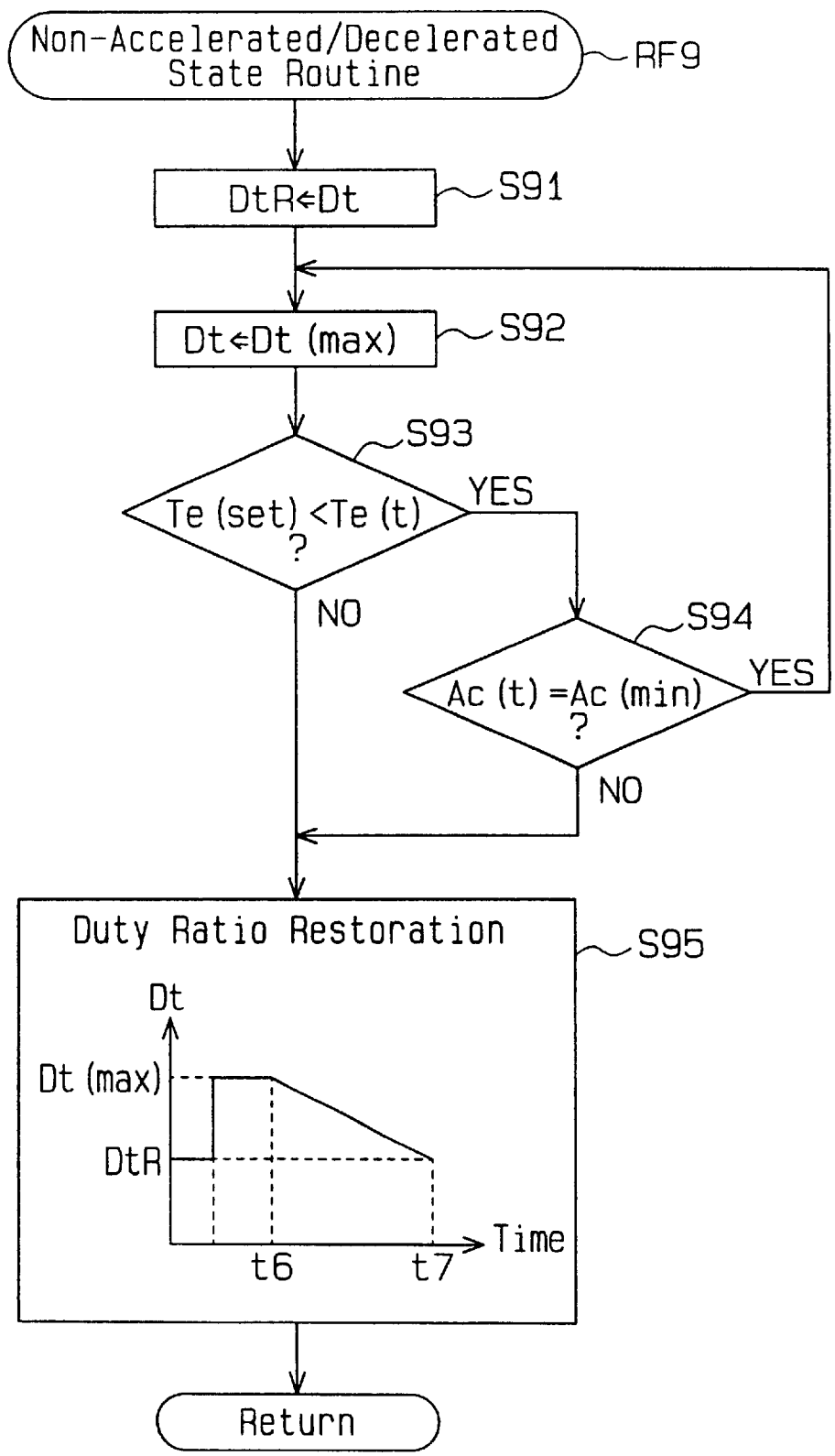
FIG. 9 is a flowchart showing a non-accelerated/decelerated state routine of the control procedure according to the present invention.

If the judgement result of S47 in the main routine of FIG. 4 is positive, the control unit 70 performs a non-accelerated/decelerated state routine RF9 of FIG. 9. In the routine RF9, the control unit 70 first stores a current duty ratio Dt as a target restoration value DtR in S91 (preparatory step). The value DtR is a target value for a duty ratio restoring step, or S95, which will be described later. Subsequently, in S92, the control unit 70 increases the duty ratio Dt to the maximum duty ratio Dt(max). The control unit 70 then instructs the driver 71 to operate the displacement control valve 40 in accordance with the maximum duty ratio Dt(max). Next, in S93, the control unit 70 judges whether the currently detected temperature Te(t) in the vicinity of the evaporator is greater than a target temperature Te(set). If the judgement of S93 is positive, the control unit 70 judges whether the current throttle actuation amount Ac(t) is the minimum throttle actuation amount Ac(min) in S94. If the judgement of S94 is positive, the duty ratio Dt is maintained as the maximum duty ratio Dt(max). The opening size of the displacement control valve 40 is thus minimum (the displacement control valve 40 is completely closed), and the crank pressure Pc is decreased. This maximizes the compressor displacement and the torque acting on the compressor. That is, energy saved by the engine when the vehicle is in a non-accelerated or decelerated state is consumed by the compressor. In other words, the cycle formed by the steps S92, S93, S94 is an energy recycling procedure in an air-conditioning apparatus corresponding to regenerative braking in electric vehicles. As described above, the non-accelerated/decelerated state routine RF9 allows the compressor to consume energy saved by the engine when the vehicle is in a non-accelerated or decelerated state. The energy saved when a decreased load acts on the engine is used so that the passenger compartment is cooled efficiently.

If the judgement of S93 is negative, or the detected temperature Te(t) is not greater than the target temperature Te(set), no further cooling is needed. If the judgement of S94 is negative, or the throttle actuation amount Ac(t) is greater than the minimum throttle actuation amount Ac(min), it is assumed that the vehicle is no longer in the non-accelerated or decelerated state. Thus, when the judgement of S93 or the judgement of S94 is negative, the duty ratio restoring step, or S95, is performed. In S95, the duty ratio Dt is gradually decreased to the target duty ratio DtR. This prevents the inclination angle of the swash plate 12 from being rapidly altered and causing an impact, like S74 of FIG. 7 and S87 of FIG. 8. In the graph shown in S95, after a negative judgement is made in S93 or S94 at a time t6, the duty ratio Dt achieves the target duty ratio DtR at a time t7. That is, the duty ratio Dt is linearly decreased to the target value DtR in a certain time period (t7–t6). When the duty ratio Dt achieves the target value DtR, the routine RF9 is terminated, and the control unit 70 resumes the main routine of FIG. 4.

This embodiment has the following advantages.

In this embodiment, the opening size of the displacement control valve 40, or the compressor displacement, is controlled regardless of the suction pressure Ps, which is varied by the heat load acting on the evaporator. Instead, the torque TQ(t) acting on the drive shaft 6 of the compressor is directly adjusted to vary the compressor displacement in accordance with the feedback control procedure of this embodiment. Accordingly, the displacement is externally controlled to be altered quickly in accordance with the operational state of the engine, regardless of the heat load acting on the evaporator. As a result, the load acting on the engine due to the operation of the compressor is removed quickly and reliably in a stable manner in accordance with the control procedure of the present invention when, for example, the vehicle is being accelerated.

When the vehicle is operated in a normal state, the compressor displacement is subjected to a feedback control procedure based on the torque TQ(t) acting on the compressor. That is, the target torque TQT is automatically altered in relation to the detected temperature Te(t) and the target temperature Te(set) (as indicated by the steps S51 to S54 in FIG. 5). The temperature in the passenger compartment is thus maintained at a comfortable level. Accordingly, in this embodiment, the compressor displacement is controlled to maintain the passenger compartment temperature at a comfortable level when the vehicle is operated in a normal state, but is rapidly reduced when the load acting on the engine must be reduced.

In this embodiment, the feedback control procedure is ;SO performed in accordance with the torque TQ(t) acting on the compressor. Thus, in the duty ratio restoring steps S74, S87, and S95, the duty ratio Dt is increased or decreased to the target duty ratio DtR in a desired manner (in this embodiment, in a linear manner). In a prior art control procedure, which depends on the suction pressure Ps, it is difficult to control variation in the torque TQ(t) acting on the compressor. That is, the prior art procedure is not capable of gradually increasing or decreasing the compressor displacement from a minimum or maximum value in a linear manner, unlike the present invention.

The displacement control valve 40, which adjusts the crank pressure Pc in this embodiment, does not require a pressure sensitive member such as a bellows. This reduces the manufacturing cost of the displacement valve as compared to a prior art target pressure altering valve.

(Modifications)

The present invention may be modified as follows.

In the first embodiment, the torque detector 60 is a non-contact type. However, the torque detector 60 may be a contact type strain gauge.

In the first embodiment, the torque detector 60 detects the torque acting on the drive shaft 6 of the compressor. However, the torque detector 60 may detect a mechanical strain (focused reactive force) in other parts of the compressor for determining the torque acting on the compressor. For example, the torque detector 60 may be a sensor that detects strain occurring in a member securing the compressor in an engine compartment or the through bolt 10 (see FIG. 1).

Although the displacement control valve 40 of the above embodiment is provided in the supply passage 28, the displacement control valve 40 may be provided in the bleeding passage 27. Alternatively, the displacement control valve 40 may be a three-way control valve for controlling the amount of the refrigerant flowing in the supply passage 28 and the amount of the refrigerant flowing in the bleeding passage 27.

In the first embodiment, the displacement control valve 40 is externally controlled to adjust its opening size continuously. However, the displacement control valve 40 may be externally controlled to change a time interval during which the valve 40 is opened or closed.

Figure 12:
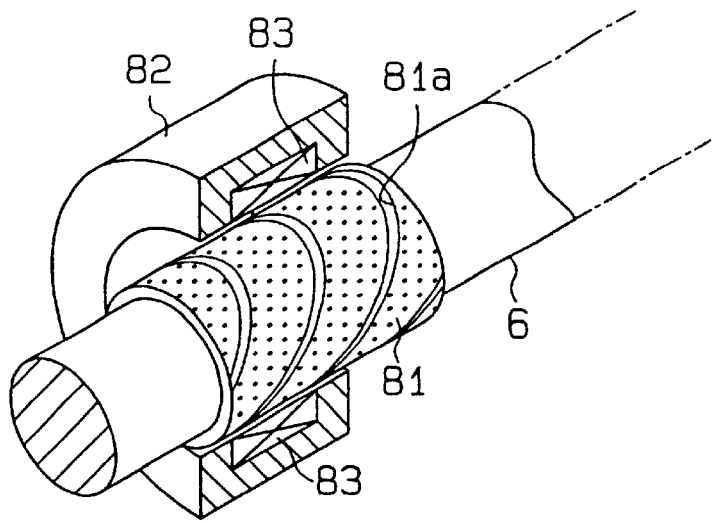
FIG. 12 is a perspective view showing a modification of a magnetostriction detecting portion of a torque detector according to the present invention.
Figure 13A:
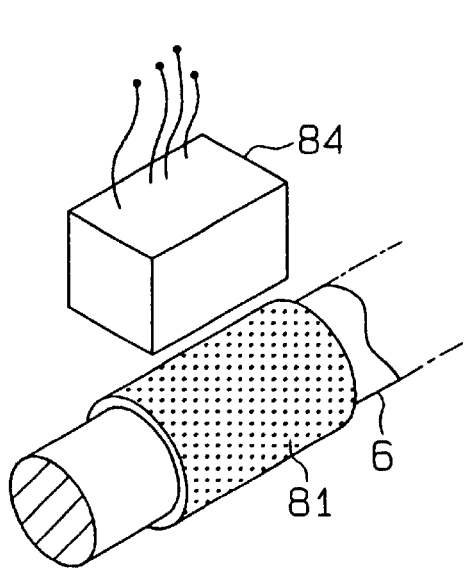
FIG. 13(A) is a perspective view showing another modification of the magnetostriction detecting portion of the torque detector.
Figure 13B:
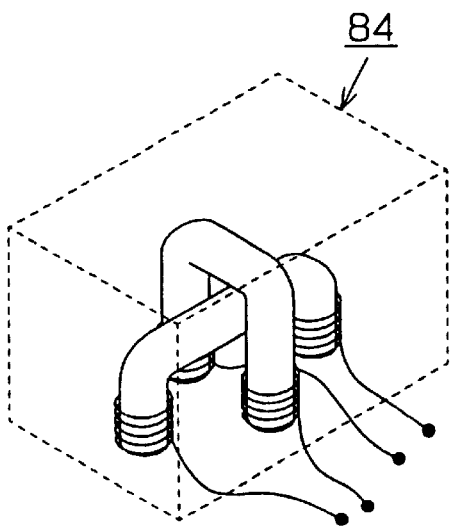
FIG. 13(B) is a perspective view showing a crosshead type pickup device of the magnetostriction detecting portion of FIG. 13(A).

The magnetostriction detecting portion (61 to 66) of the torque detector 60, which is provided in the vicinity of the projecting end of the drive shaft 6, as shown in FIGS. 1 and 3, may be replaced by a magnetostriction detecting portion of FIGS. 12 or 13. The magnetostriction detecting portion of FIG. 12 includes a magnetic film (magnetostrictive ring) 81 fitted around the outer side of the drive shaft 6, a magnetic collecting yoke 82, and a detecting coil 83. The magnetostrictive ring 81 has a predetermined radial dimension (for example, one millimeter) and a predetermined longitudinal dimension along the drive shaft 6 (for example, thirty millimeters or more). It is preferred, although not mandatory, that a slanted groove 81a is formed in the magnetostrictive ring 81, as shown in FIG. 12, for improving the detection accuracy of magnetostriction caused by reactive torque during the operation of the compressor. The yoke 82 is formed of metal and arranged around the magnetostrictive ring 81 with a certain space formed between the ring 81 and the yoke 82. Like the coils 63 to 66 of FIG. 1, the yoke 82 is supported by the inner circumferential wall of the front housing member 2 near the projecting end of the drive shaft 6. The yoke has a U-shaped cross section and holds the detection coil 83, as shown in FIG. 12. The detection coil 83 corresponds to the secondary coils 65, 66 of FIG. 3. The yoke 82 and the coil 83 do not contact the magnetostrictive ring 81. Alternatively, a magnetostriction detecting portion of FIG. 13(A) includes a magnetostrictive ring 81 and a magnetometric sensor 84. The magnetostrictive ring 81 has a structure substantially identical to that of FIG. 12 except that the ring 81 does not include the slanted groove 81a. The ring 81 does not contact the magnetometric sensor 84. It is preferred that the magnetometric sensor 84 is a crosshead type pickup device, as shown in FIG. 13(B). If the crosshead type pickup device is used as the magnetometric sensor 84, the magnetostrictive ring 81 may be omitted as long as the required detection accuracy for magnetostriction is satisfied. In the magnetostriction detecting portions of FIGS. 12 and 13, the drive shaft 6, which carries the magnetostrictive ring 81, is strained by the torque acting on the compressor. This produces magnetostriction on the magnetostrictive ring 81 in accordance with the strain of the ring 81, thus altering the voltage (or current) induced in the detection coil 83 or the magnetometric sensor 84. The torque acting on the compressor correlates with the voltage induced in the detection coil 83 or the magnetometric sensor 84. As a result, the torque acting on the compressor is detected in accordance with the voltage induced in the detection coil 83 or the magnetometric sensor 84.

It should be apparent to those skilled in the art that the present invention may be embodied in many other specific forms without departing from the sprit or scope of the invention. Therefore, the present examples and embodiments are to be considered as illustrative and not restrictive and the invention is not to be limited to the details given herein, but may be modified within the scope and equivalence of the appended claims.

What is claimed is:

1. An air-conditioning apparatus having a refrigerant circuit-including a condenser, a pressure reducing device, an evaporator, and a variable displacement compressor, the air-conditioning apparatus comprising:
    a torque detecting device for directly or indirectly detecting torque acting on the compressor during operation of the compressor;
    an external information detecting device for detecting various external information other than the torque; and
    a control device actively computing a target torque in accordance with the external information provided by the external information detecting device and executing a feedback control program for displacement of the compressor such that the torque detected by the torque detecting device approaches the target torque.

2. The air-conditioning apparatus as set forth in claim 1, wherein:
    the external information detecting device includes at least a temperature sensor for detecting the temperature in a passenger compartment and a temperature selector for selecting a target temperature; and
    the control device determines the target torque through comparison between the temperature detected by the temperature sensor and the target temperature selected by the temperature selector.

3. The air-conditioning apparatus as set forth in claim 2, wherein the temperature sensor is provided in the vicinity of the evaporator for detecting the temperature of air passing through the evaporator.

4. An air-conditioning apparatus having a refrigerant circuit including a condenser, a pressure reducing device, an evaporator, and a variable displacement compressor, the air-conditioning apparatus comprising:
    a torque detecting device for directly or indirectly detecting torque acting on the compressor during operation of the compressor;
    an external information detecting device for detecting various external information other than the torque; and
    a control device determining a target torque in accordance with the external information provided by the external information detecting device and executing a feedback control program for displacement of the compressor such that the torque detected by the torque detecting device approaches the target torque;
    wherein the control device determines whether the air-conditioning apparatus is in a normal state or in a non-normal state in accordance with the external information, and the control device discontinues the feedback control program for controlling the compressor displacement such that the torque approaches a predetermined value, regardless of the target torque, if the air-conditioning apparatus is in the non-normal state.

5. The air-conditioning apparatus as set forth in claim 4, wherein the predetermined value is a minimum or maximum value of the torque.

6. An air-conditioning apparatus having a refrigerant circuit including a condenser, a pressure reducing device, an evaporator, and a variable displacement compressor, the air-conditioning apparatus comprising:
    a torque detecting device for directly or indirectly detecting torque acting on the compressor during operation of the compressor;
    an external information detecting device for detecting various external information other than the torque; and
    a control device determining a target torque in accordance with the external information provided by the external information detecting device and executing a feedback control program for displacement of the compressor such that the torque detected by the torque detecting device approaches the target torque;
    wherein the external information detecting device includes at least a throttle sensor for detecting the position of a throttle; and
    the control device determines whether a vehicle is in a non-normal state in accordance with at least the throttle position detected by the throttle sensor, and the control device discontinues the feedback program for controlling the compressor displacement to minimize the torque if the vehicle is in an increased load state or in an accelerated state.

7. The air-conditioning apparatus as set forth in claim 6, wherein the control device performs a displacement restoration procedure for restoring the torque from a level set during the non-normal state to the torque originally detected before the non-normal state, in a predetermined manner.

8. An air-conditioning apparatus having a refrigerant circuit including a condenser, a pressure reducing device, an evaporator, and a variable displacement compressor, the air-conditioning apparatus comprising:

a torque detecting device for directly or indirectly detecting torque acting on the compressor during operation of the compressor;

an external information detecting device for detecting various external information other than the torque; and a control device determining a target torque in accordance with the external information provided by the external information detecting device and executing a feedback control program for displacement of the compressor such that the torque detected by the torque detecting device approaches the target torque;

wherein the external information detecting device includes at least a throttle sensor for detecting the position of a throttle; and the control device determines whether a vehicle is in a non-normal state in accordance with at least the throttle position detected by the throttle sensor, and discontinues the feedback program for controlling the compressor displacement to maximize the torque if the vehicle is in an non-accelerated state or in a decelerated state.

9. An air-conditioning apparatus having a refrigerant circuit including a condenser, a pressure reducing device, an evaporator, and a variable displacement compressor, the air-conditioning apparatus comprising:

a torque detecting device for directly or indirectly detecting torque acting on the compressor during operation of the compressor;

an external information detecting device for detecting various external information other than the torque; and a control device determining a target torque in accordance with the external information provided by the external information detecting device and executing a feedback control program for displacement of the compressor such that the torque detected by the torque detecting device approaches the target torque;

wherein the variable displacement compressor has a discharge chamber connected to the condenser, a suction chamber connected to the evaporator, a crank chamber accommodating an inclining cam plate, and a displacement control valve provided in a refrigerant passage passing through the discharge chamber, the crank chamber, and the suction chamber, the displacement control valve being externally controlled to operate in accordance with an electric current supply to the displacement control valve; and the control device adjusts an opening size of the displacement control valve in accordance with the electric current supply to the displacement control valve for controlling the pressure in the crank chamber to alter the compressor displacement.

10. The air-conditioning apparatus as set forth in claim 9, wherein the opening size of the displacement control valve is adjusted through in accordance with the electric current supply, regardless of the suction pressure.

11. The air-conditioning apparatus as set forth in claim 9, wherein the displacement control valve is provided in a passage connecting the discharge chamber to the crank chamber.

12. An air-conditioning apparatus having a refrigerant circuit including a condenser, a pressure reducing device, an evaporator, and a variable displacement compressor, the air-conditioning apparatus comprising:

a torque detecting device for directly or indirectly detecting torque acting on the compressor during operation of the compressor;

an external information detecting device for detecting various external information other than the torque; and a control device determining a target torque in accordance with the external information provided by the external information detecting device and executing a feedback control program for displacement of the compressor such that the torque detected by the torque detecting device approaches the target torque;

wherein the torque detecting device detects the torque acting on a drive shaft of the compressor.

13. An air-conditioning apparatus having a refrigerant circuit including a condenser, a pressure-reducing device, an evaporator, and a variable displacement compressor, the air-conditioning apparatus comprising:

a torque detecting device for directly or indirectly detecting torque acting on the compressor during operation of the compressor;

an external information detecting device for detecting various external information other than the torque; and a control device determining a target torque in accordance with the external information provided by the external information detecting device and executing a feedback control program for displacement of the compressor such that the torque detected by the torque detecting device approaches the target torque;

wherein the torque detecting device has a magnetostriction detecting portion including a crosshead type pickup device.

14. A method for controlling displacement of a variable displacement compressor installed in an air-conditioning apparatus for a vehicle comprising:

executing a feedback control program for controlling the compressor displacement such that reaction torque of the compressor approaches a target torque, which is determined in accordance with the temperature in a passenger compartment when a vehicle is in a normal operational mode; and discontinuing the feedback control program such that the torque approaches a predetermined value when the vehicle is in a non-normal operational mode.

15. The method for controlling the displacement of the variable displacement compressor as set forth in claim 14 comprising choosing the predetermined value to be a minimum or maximum value of the torque.

16. The method for controlling the displacement of the variable displacement compressor as set forth in claim 14 comprising:

varying the displacement of the variable displacement compressor by controlling the pressure in a crank chamber through adjustment of an opening size of a displacement control valve; and varying the opening size of the displacement control valve in accordance with an electric current supply to the displacement control valve, wherein the compressor displacement varies in accordance with the electric current supply to the displacement control valve.

* * * * *